US010273175B2

(12) United States Patent
Jowett

(10) Patent No.: US 10,273,175 B2
(45) Date of Patent: Apr. 30, 2019

(54) SEWAGE TREATMENT SYSTEM

(71) Applicant: Waterloo Biofilter Systems Inc., Rockwood (CA)

(72) Inventor: Edwin Craig Jowett, Rockwood (CA)

(73) Assignee: Waterloo Biofilter Systems Inc., Rockwood, Ontario (CA)

( * ) Notice: Subject to any disclaimer, the term of this patent is extended or adjusted under 35 U.S.C. 154(b) by 0 days.

(21) Appl. No.: 15/485,702

(22) Filed: Apr. 12, 2017

(65) Prior Publication Data
US 2018/0297876 A1 Oct. 18, 2018

(51) Int. Cl.
*C02F 3/28* (2006.01)
*E03F 11/00* (2006.01)
*E03F 3/04* (2006.01)
*E03F 5/18* (2006.01)
*C02F 103/00* (2006.01)

(52) U.S. Cl.
CPC ............ *C02F 3/2866* (2013.01); *C02F 3/286* (2013.01); *E03F 3/04* (2013.01); *E03F 5/18* (2013.01); *E03F 11/00* (2013.01); *C02F 2103/005* (2013.01); *C02F 2203/006* (2013.01); *Y02A 20/216* (2018.01)

(58) Field of Classification Search
CPC .. C02F 3/286; C02F 3/2866; C02F 2103/005; C02F 2203/006; E03F 3/04; E03F 11/00; B01D 21/2405
USPC ............................................... 210/519, 532.2
See application file for complete search history.

(56) References Cited

U.S. PATENT DOCUMENTS

| | | | |
|---|---|---|---|
| 1,394,780 A | 10/1921 | Nicholas | |
| 2,068,140 A * | 1/1937 | Jaquith | ..................... C02F 3/28 210/532.2 |
| 3,826,376 A * | 7/1974 | Carlson | ................... E03F 11/00 210/519 |
| 4,886,605 A | 12/1989 | Herve | |
| 5,458,777 A * | 10/1995 | Khatib | ............... B01D 17/0208 210/519 |
| 5,714,069 A | 2/1998 | Sager et al. | |
| 6,416,675 B1 | 7/2002 | McCasland et al. | |
| 6,749,745 B2 | 6/2004 | Jowett | |
| 6,773,592 B2 | 8/2004 | Bellamy et al. | |

(Continued)

FOREIGN PATENT DOCUMENTS

| | | |
|---|---|---|
| EP | 2905387 A1 | 8/2015 |
| JP | 08165704 A | 6/1996 |

OTHER PUBLICATIONS

English translation of JP08165704, as published on Jun. 25, 1996.

*Primary Examiner* — Christopher Upton
(74) *Attorney, Agent, or Firm* — Philip C. Mendes da Costa; Bereskin & Parr LLP/S.E.N.C.R.L., s.r.l.

(57) ABSTRACT

A septic system, including a septic tank and a pipe positioned within the septic tank, is provided. The pipe receives sewage and provides a flooded, anaerobic environment for sewage passing therethrough. The outlet of the pipe is positioned inside the septic tank and is optionally spaced from the outlet of the septic tank. In operation, the sewage introduced into the pipe generally separates into a solid portion comprising sludge, which remains in the pipe, and a liquid portion, which passes through and around the sludge. In one embodiment, the septic system has an absence of a sump chamber upstream of the septic tank.

23 Claims, 9 Drawing Sheets

(56) References Cited

U.S. PATENT DOCUMENTS

| | | | |
|---|---|---|---|
| 7,022,222 B2 | 4/2006 | Jowett | |
| 9,273,456 B1 | 3/2016 | Miles et al. | |
| 2001/0027954 A1* | 10/2001 | Broeders | B01D 21/2405 210/519 |
| 2003/0062324 A1* | 4/2003 | Abrams | B01D 17/0208 210/519 |
| 2010/0012557 A1* | 1/2010 | Chaffee | C02F 3/2846 210/532.2 |
| 2012/0255891 A1* | 10/2012 | Groleau | C02F 3/301 210/150 |

* cited by examiner

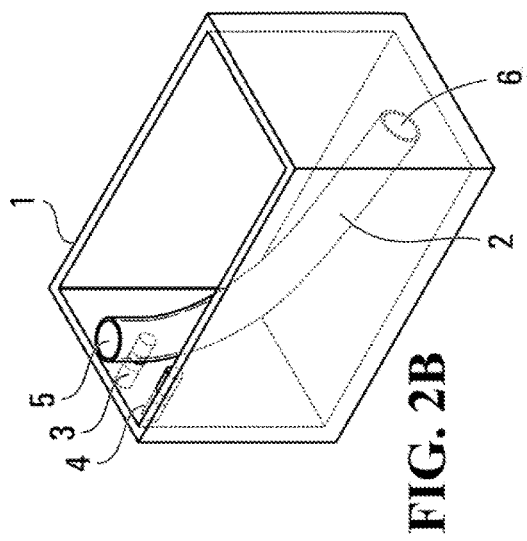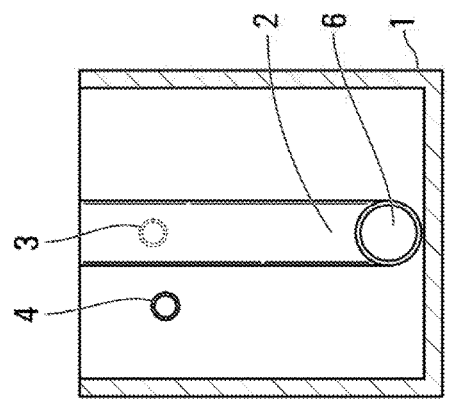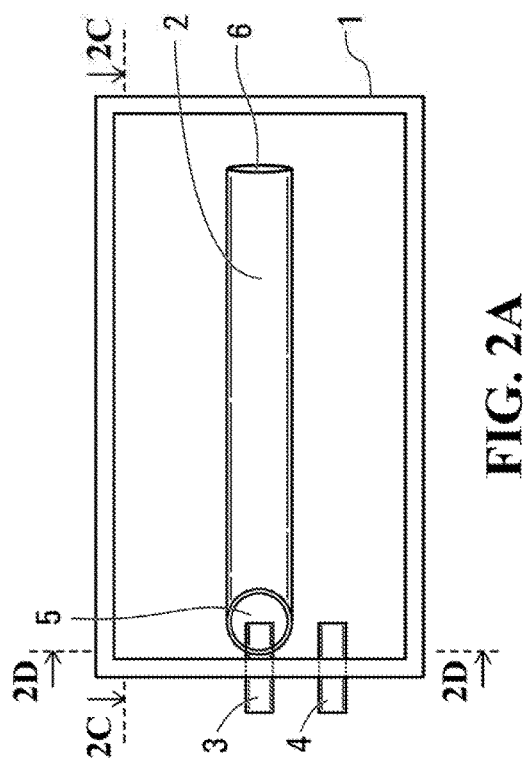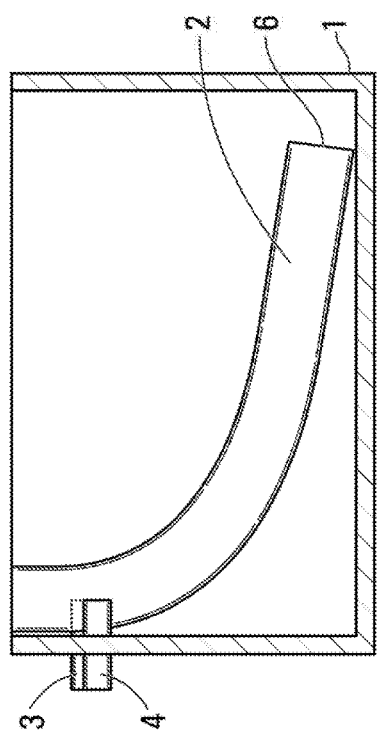

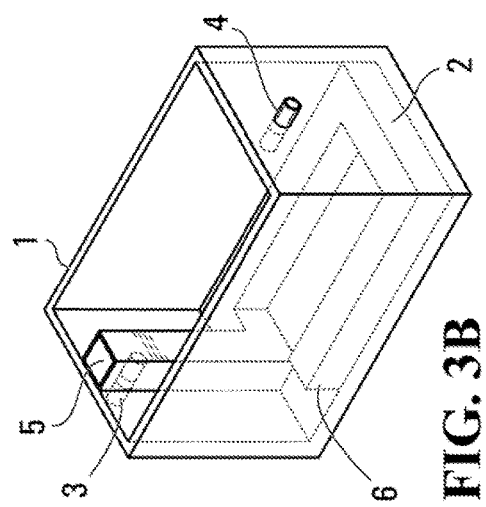
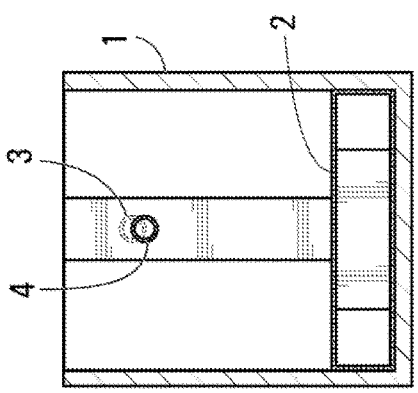
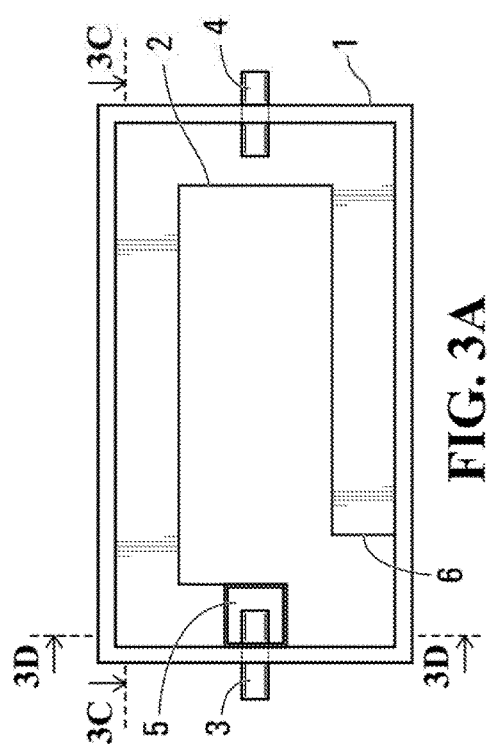
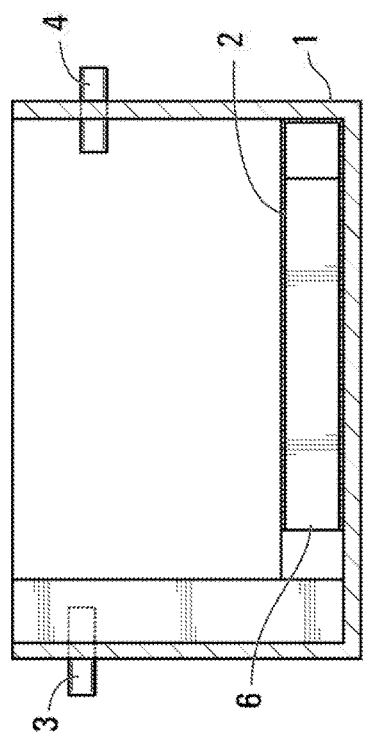

SEWAGE TREATMENT SYSTEM

FIELD

This disclosure relates to systems for treating sewage and other organic wastewaters; and more specifically to septic systems.

INTRODUCTION

Anaerobic treatment tanks, also known as septic tanks, are designed to receive sewage. Solids settle or float within the tank, and scum forms at the surface. Some of the settled solids are anaerobically digested, and any remaining solids are pumped out on a regular basis. However, as tanks are typically box-like and blocky shaped without flow-directing baffles, septic tanks do not function as true anaerobic digesters that promote fermentation and hydrolysis reactions for substantially all of the solid waste that enters the septic tank. "True digesters" are designed so that flow is directed to minimize hydraulically stagnant zones, and this directional flow, although slow, produces an improved environment to maximize anaerobic microbial digestion.

"Upflow Anaerobic Sludge Blanket" (UASB) systems are vertical septic tanks with a raw sewage feed to the bottom of the tank, wherein the sewage passes upward through the tank to the outlet of the tank some distance above. The granulated microbial sludge particles (coarse grained granules) that form in the UASB tank function as the treatment "filter medium" as they stay suspended within the tank volume as liquid passes up, through, and around them, feeding the microbes in the granules.

U.S. Pat. Nos. 6,749,745 and 7,022,222, both to E.C. Jowett, describe a large diameter flooded tubular tank with an inlet chamber that receives raw sewage and functions as a more efficient septic tank than blocky shaped tanks. The tubular tank minimizes stagnant zones, turbulent flow, and hard surface scum production, and as a result solids are more thoroughly digested with an increase in water and gas by-products and less residual undigested solids. However, the manufacture and installation of such a configuration can be costly.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

As set out herein, in accordance with this disclosure, raw sewage may be fed directly into a small diameter treatment pipe which is located inside a typical septic tank and empties into the septic tank without the need for a solids settling chamber upstream of the inlet of the treatment pipe. An advantage of this design is that a longitudinally extending flow conduit, that may be of any particular cross-sectional shape, such as a thin walled, smaller diameter, flexible pipe, may be inserted into any standard box-like tank. Accordingly, waste may be delivered to a septic tank whereupon the waste enters the flow conduit and passes through the flow conduit prior to entering the volume defined by the wall of the septic tank (i.e., the portion of the septic tank exterior to the flow conduit contained therein). Accordingly, the waste travels through the flow conduit prior to entering the open volume of the septic tank. During the passage of solid waste such as toilet paper, fecal matter, etc. through the flow conduit, the solid waste is partially digested and therefore less anaerobic digestion is required in the portion of the septic tank exterior to the flow conduit contained therein. Without being bound by theory, it is believed that as sewage solids and dissolved contaminants are digested, the microbial flocculent and granular sludge formed within the flow conduit accumulates and helps treat the incoming sewage water. The sludge is buoyant or neutral-buoyant and becomes a submerged filtration medium through which wastewater passes through and around the sludge particles. The more thorough the digestion of dissolved and suspended sewage constituents into smaller molecules and more 'labile' molecules, the better the treatment downstream in aerobic treatment or disposal units. Anaerobically digested sewage is more readily digested in the aerobic environment. Accordingly, one of the advantages of the present disclosure is to provide a septic system which results in more thorough digestion of sewage into smaller molecules and with fewer suspended solids, as well as requiring less frequent pump-outs of sludge build-up. The effluent will have lower suspended solids to prevent blockage of the disposal area or filtration unit. A further advantage is that the portion of the septic tank exterior to the flow conduit contained therein may act as an insulation member thereby resulting in the interior of the flow conduit being less prone to temperature swings as the ground surrounding the septic tank, e.g., cools during winter. Therefore, the rate of digestion in the flow conduit may be less affected by changes in the weather.

According to one broad aspect of the disclosure, a septic system is provided. In accordance with this aspect, the septic system comprises a septic tank having an inlet, an outlet, a length, a liquid volume and a liquid depth and a pipe positioned within the septic tank, the pipe having an inlet at the upstream end of the pipe and an outlet at the downstream end of the pipe. The inlet end of the pipe is connected to the inlet of the septic tank whereby the pipe provides a flooded, anaerobic environment for sewage passing therethrough. In further accordance with this aspect, the pipe has a diameter of at least 10% the liquid depth of the tank, and at least one of; a volume of at least 5% that of the liquid volume of the tank, and a length of at least 50% the length of the tank.

In one embodiment, the pipe has a diameter of at least 10% the liquid depth of the tank, a volume of at least 5% that of the liquid volume of the tank, and a length of at least 50% the length of the tank.

In one embodiment, all or part of the pipe may be built into a wall of the septic tank.

In another embodiment, the downstream end of the pipe may extend upwardly.

In another embodiment, the outlet of the pipe may be spaced from the outlet of the septic tank.

In another embodiment, the pipe may be flexible or rigid.

In another embodiment, the septic system is a residential septic system and the pipe may have a residence time of 3-15 hours, optionally 8-12 hours. The term "residence time" herein is calculated from the design flow, which is the peak flow expected in any day from the facility, and is not necessarily the actual residence time due to water conservation, plumbing leaks, vacations, etc.

In another embodiment, the pipe may have a volume of 5-20% the liquid volume of the septic tank, optionally 5-15% the liquid volume of the septic tank. In a further embodiment the pipe has a volume of about 10% the liquid volume of the septic tank.

In another embodiment, the septic system may be a residential septic system and the pipe may have a diameter of 6-15 inches, optionally 10-12 inches.

In another embodiment, the septic system may be a commercial septic system and the pipe may have a diameter of 15-30 inches, optionally 20-25 inches.

In another embodiment, the outlet of the pipe may face towards the inlet of the septic tank.

In another embodiment, the pipe may have a first portion that extends away from the inlet of the septic tank and a second downstream portion that extends back towards the inlet of the septic tank.

In another embodiment, the outlet of the septic tank may be at an upper end of the septic tank and the outlet of the pipe may be at a lower end of the septic tank.

In another embodiment, the outlet of the pipe may be located towards the outlet of the septic tank.

In another embodiment, the inlet to the septic tank may be connected directly to a sewage pipe whereby the septic system has an absence of a sump chamber upstream of the septic tank.

According to another broad aspect of the disclosure, a septic system is provided. In accordance with this aspect, the septic system comprises (a) a septic tank having an inlet, an outlet, a length, a liquid volume and a liquid depth; and, (b) a flow conduit positioned within the septic tank, the conduit having an inlet at the upstream end of the conduit and an outlet at the downstream end of the conduit. The inlet end of the conduit is connected to the inlet of the septic tank whereby the conduit receives sewage and provides a flooded, anaerobic environment for sewage passing therethrough, the outlet of the conduit positioned inside the septic tank. In further accordance with this aspect, the conduit has a cross-sectional area of at least 3% of a cross-sectional area of the tank, and at least one of; a cross-sectional height to width ratio of 0.2 to 2.0, a volume of at least 5% that of the liquid volume of the tank, and a length of at least 50% the length of the tank.

In one embodiment, the conduit has a cross-sectional area of at least 3% of a cross-sectional area of the tank, a cross-sectional height to width ratio of 0.2 to 2.0, a volume of at least 5% that of the liquid volume of the tank, and a length of at least 50% the length of the tank.

In one embodiment, the outlet of the conduit may be spaced from the outlet of the septic tank.

In another embodiment, the outlet of the conduit may face towards the inlet of the septic tank.

In another embodiment, the conduit may have a first portion that extends away from the inlet of the septic tank and a second downstream portion that extends back towards the inlet of the septic tank.

In another embodiment, the outlet of the septic tank may be at an upper end of the septic tank and the outlet of the conduit may be at a lower end of the septic tank.

In another embodiment, the outlet of the conduit may be located towards the outlet of the septic tank.

BRIEF DESCRIPTION OF THE DRAWINGS

The drawings included herewith are for illustrating various examples of systems, methods, and apparatuses of the teaching of the present disclosure and are not intended to limit the scope of what is taught in any way.

FIG. 1 shows multiple views of an anaerobic tank in a septic system in accordance with at least one embodiment of the disclosure.

FIG. 2 shows multiple views of an alternate septic system in accordance with at least one embodiment of the disclosure. FIG. 2A is a top view, FIG. 2B is a top perspective view showing the inner pipe, FIG. 2C is a side view taken along line 2C of FIG. 2A and FIG. 2D is a side view taken along line 2D of FIG. 2A.

FIG. 3 shows multiple views of a further alternate septic system in accordance with at least one embodiment of the disclosure. FIG. 3A is a top view, FIG. 3B is a top perspective view showing the inner pipe, FIG. 3C is a side view taken along line 3C of FIG. 3A and FIG. 3D is a side view taken along line 3D of FIG. 3A.

FIG. 4 shows multiple views of a further alternate septic system in accordance with at least one embodiment of the disclosure.

FIG. 5 shows multiple views of a further alternate septic system in accordance with at least one embodiment of the disclosure.

FIG. 6 shows two views of a further alternate septic system in accordance with at least one embodiment of the disclosure.

DESCRIPTION OF VARIOUS EMBODIMENTS

Figure 1A:
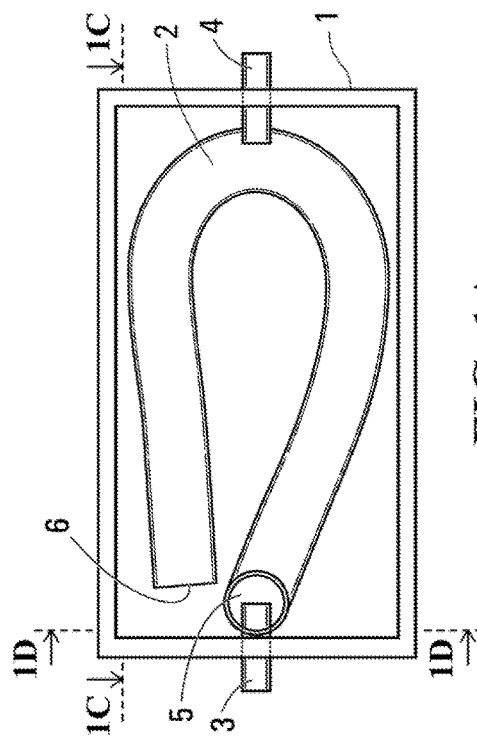
FIG. 1A is a top view.
Figure 1B:
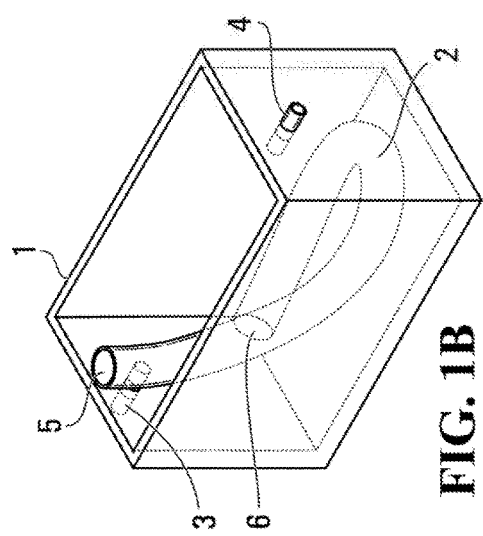
FIG. 1B is a top perspective view showing the inner pipe.
Figure 1C:
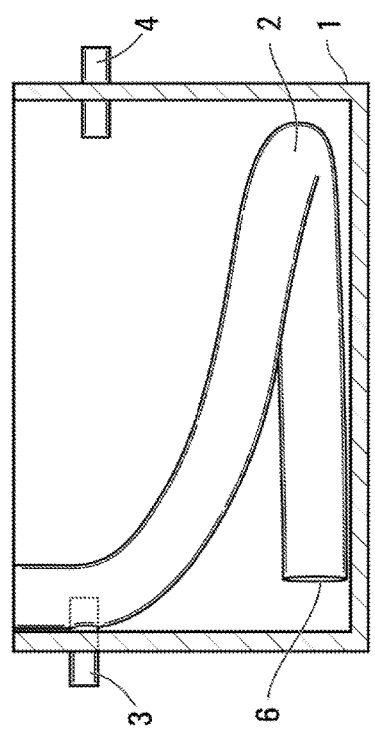
FIG. 1C is a side view taken along line 1C of FIG. 1A
Figure 1D:
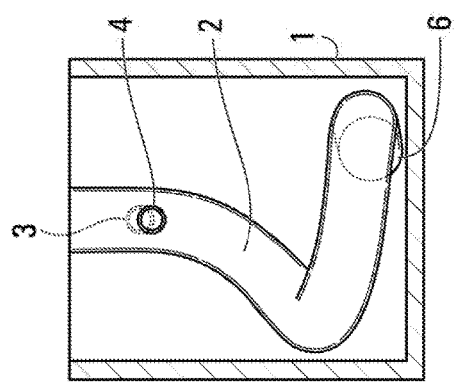
FIG. 1D is a side view taken along line 1D of FIG. 1A.
Figure 4A:
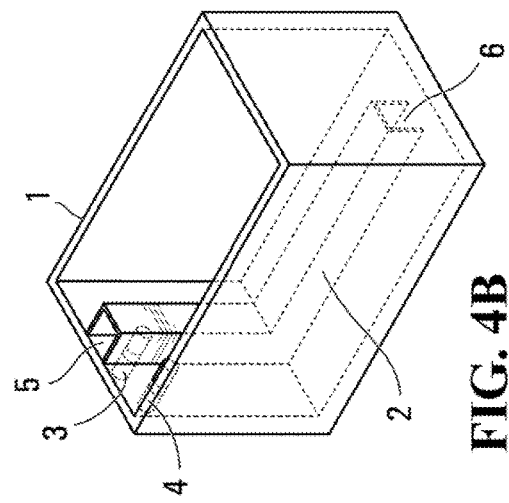
FIG. 4A is a top view.
Figure 4B:
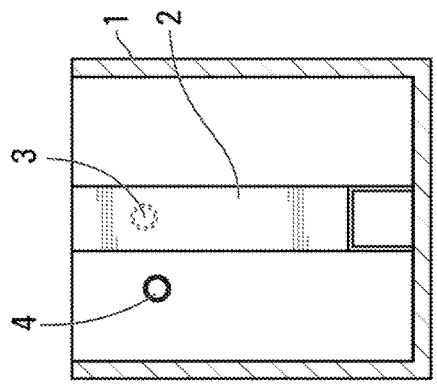
FIG. 4B is a top perspective view showing the inner pipe.
Figure 4C:
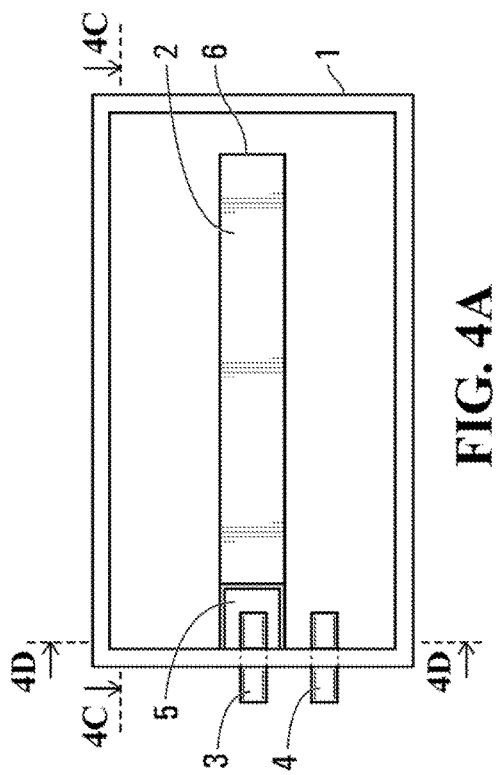
FIG. 4C is a side view taken along line 4C of FIG. 4A
Figure 4D:
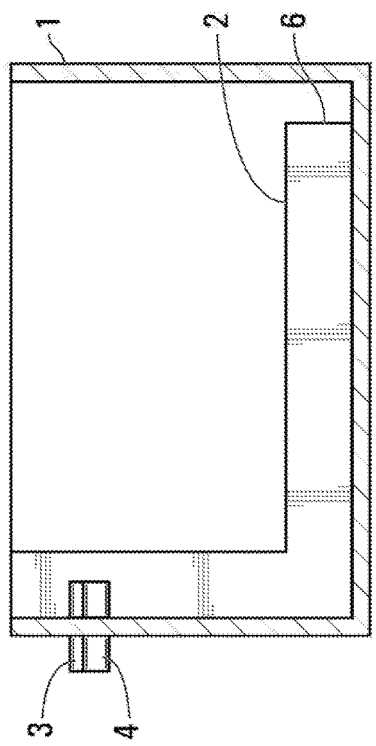
FIG. 4D is a side view taken along line 4D of FIG. 4A.
Figure 5B:
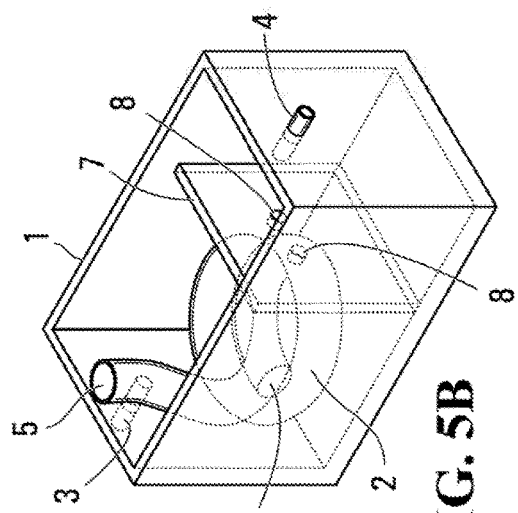
FIG. 5B is a top perspective view showing the inner pipe.
Figure 5D:
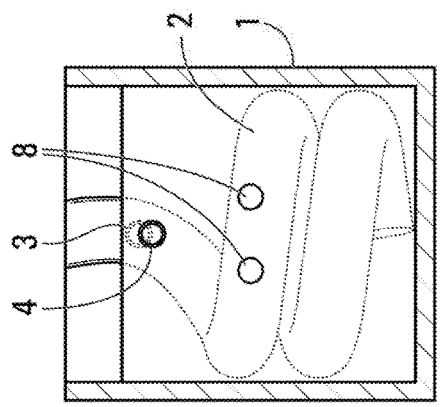
FIG. 5D is a side view taken along line 5D of FIG. 5A.
Figure 5A:
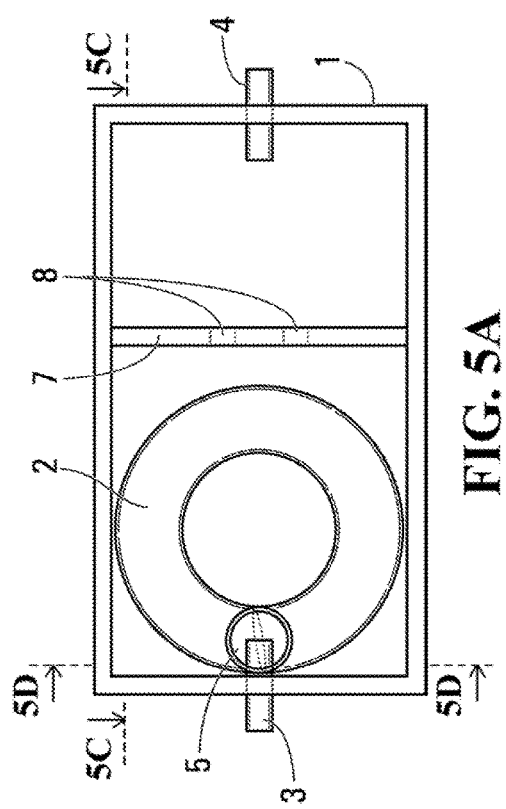
FIG. 5A is a top view.
Figure 5C:
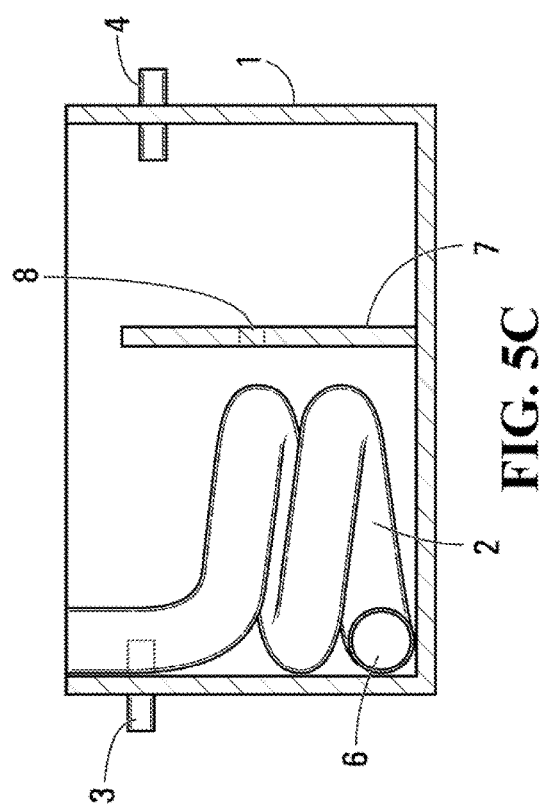
FIG. 5C is a side view taken along line 5C of FIG. 5A

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. The terms "a," "an" and "the" mean "one or more," unless expressly specified otherwise.

The disclosure provides sewage treatment systems comprising a septic tank and a pipe positioned within the septic tank, whereby the pipe provides a flooded, anaerobic environment for sewage passing therethrough. As used herein, the term "septic tank" refers to a tank used for treatment of sewage, wherein the tank provides an environment for the anaerobic bacterial digestion of waste in the tank. The present inventor observed that using a pipe positioned within the septic tank to receive sewage results in improved treatment of the sewage over conventional septic tanks.

Both residential and commercial sewage treatment systems are contemplated in this disclosure.

FIG. 1-9 exemplify septic systems in accordance with various embodiments of the disclosure. The septic systems include a septic tank 1 having a tank inlet 3, which receives sewage flowing into tank 1, and tank outlet 4, out of which treated water is discharged from tank 1. The treated water discharged out of tank 1 is also referred to herein as effluent.

Various sizes and designs of septic tanks are well known in the art. For example, as exemplified in FIG. 1, tank 1 is rectangular in shape. However, it will be appreciated that tank 1 may be of other shapes such as round or oval. Tank 1 may be a residential or commercial septic tank and is sized accordingly. For example, tank 1 optionally may have a capacity (or volume) of at least 750, 1000, 1250, 1500, 2000, 3000, 4000 or 5000 gallons. For commercial sites, tank 1 may be sized to have the capacity to hold 2-3 times the volume of the design or peak daily sewage volume from the facility. As used herein, the term "tank liquid volume" refers to the volume of liquid in the tank during normal operation. In the case where a septic tank has no air space above the liquid level, the tank liquid volume can be equal to, or 100% of, the tank volume during normal operation. Typically, the air space is a standard 8"-12" and the tank liquid volume is 65-85% of the tank volume, depending on whether the liquid level is constant and controlled by the outlet invert, or variable when the liquid is being pumped out from within the tank. A list of various tank models, their interior dimensions and their capacities is provided in Table 1.

As is also well known in the art, a septic tank may be constructed out of various materials. For example, tank 1 may be made from concrete, fiberglass, plastic or other materials known in the art.

Pipe 2 is positioned within tank 1. Pipe 2 has a pipe inlet 5 and a pipe outlet 6. Both pipe inlet 5 and a pipe outlet 6 may be positioned within tank 1. Further, if pipe 2 is to be pumped out when the liquid level in pipe 2 has been lowered, then pipe inlet may be located below the operating liquid level in tank 1. Optionally, inlet 5 may be located above the operating liquid level in tank 1 and may be provided at the upper wall of tank 1 or, as exemplified in FIG. 9, above the top of tank 1. In other embodiments, tank inlet 3 may be higher than tank outlet 4.

The upstream end of pipe 2 is connected to tank inlet 3 such that, in operation, sewage flowing into tank 1 through tank inlet 3 flows into pipe 2. Accordingly, pipe 2 may be connected to tank inlet 3 in any manner which allows sewage to flow from tank inlet 3 into pipe 2. For example, tank inlet 3 may be connected directly or indirectly to pipe inlet 5. Accordingly, when waste enters pipe 2, it will flow towards pipe outlet 6. Tank inlet 3 may be in communication with the upstream end of pipe 2 and may be inserted therein and secured in place by, e.g., an adjustable clamp, an O-clamp or the like. Alternately as exemplified in FIG. 1, tank inlet 3 may be a conduit extending into the septic tank and extending through a sidewall of pipe 2. An advantage of this design is that the pipe inlet 5 is available for pump out of pipe 2. In one embodiment, pipe inlet 5 and/or pipe outlet 6 are large enough to allow pumping out of the solids in pipe 2. Solids are optionally pumped out of both pipe inlet 5 and pipe outlet 6. Solids may also be pumped out of tank 1. Optionally, a pipe may be inserted into pipe inlet 5 and/or pipe outlet 6 to allow pumping out of accumulated solids such as the sludge described in detail below or a hose may be connected to pipe inlet 5 and/or pipe outlet 6 to enable pump out.

Accordingly, in one embodiment, all of the sewage flowing through tank inlet 3 flows into pipe 2. Tank inlet 3 may be temporarily or permanently connected to pipe inlet 5, and in a preferred embodiment is permanently connected. Various configurations of tank inlet 3 and pipe inlet 5 such that sewage flows from tank inlet 3 into pipe inlet 5 would be readily apparent to a person of skill in the art.

Pipe outlet 6 is positioned inside tank 1 and may be positioned such that partially treated waste exiting pipe outlet 6 into tank 1 will not travel directly to tank outlet 4. Accordingly, the partially treated waste entering tank 1 may be further digested in tank 1. Accordingly, as exemplified, pipe outlet 6 may be spaced from tank outlet 4. This configuration allows liquid exiting from pipe 2 to migrate through the tank before it leaves the tank through tank outlet 4. As exemplified in FIGS. 1-5 pipe outlet 6 may be on the opposite end of the tank from tank outlet 4. However, in another embodiment, pipe outlet 6 may be at the same end as tank outlet 4. In such a case, pipe outlet 6 may be spaced from tank outlet 4 such as by positioning pipe outlet 6 in a lower portion of tank 1. It will be appreciated that, as exemplified in FIGS. 1-5, pipe outlet 6 may be positioned lower in the tank than tank outlet 4. For example, pipe outlet 6 may be at a lower end of tank 1 and tank outlet 4 may be at an upper end of tank 1. In other embodiments, pipe outlet 6 may be spaced at least 1 meter, at least 1.5 meters, at least 2.0 meters, at least 2.5 meters or at least 3 meters from tank outlet 4. In another embodiment, pipe outlet 6 may be spaced such that liquid exiting from pipe 2 remains in tank 1 for the longest period possible before exiting through tank outlet 4.

It will be appreciated that pipe 2 may be freely moveable in tank 1 (e.g., pipe 2 may not be fixed to the interior of tank 1 so as to prevent pipe 2 moving during use), pipe 2 may be freely moveable in tank 1 but pipe outlet 6 may be fixed in position or pipe 2 may be fixed in position (e.g., it may be a rigid conduit, it may be secured in position in tank 1 so as not to move during use or it may be built in to the walls of tank 1 (see for example the embodiment of FIGS. 3 and 4)). In some embodiments, liquid flowing out of pipe outlet 6 may flow in a generally opposite direction to liquid flowing out of tank outlet 4 (see for example, FIGS. 1-4). In such embodiments, pipe outlet 6 may be located away from tank outlet 4 and/or pipe outlet 6 may face towards tank inlet 3. Other embodiments are also contemplated wherein pipe outlet 6 faces away from tank inlet 3. In further embodiments, pipe outlet 6 is located at, or towards, the inlet end of the tank and pipe outlet 6 faces up, down or sideways.

In some embodiments, liquid flowing out of pipe outlet 6 may flow in generally the same direction to liquid flowing out of tank outlet 4.

Optionally, as exemplified in FIG. 5, a dividing wall 7 may be provided to separate the interior volume of tank 1 such that, for example, pipe outlet 6 may be on one side of the dividing wall 7 and tank outlet 4 may be on the other side of the wall. Accordingly, dividing wall 7 may extend from the bottom of the tank to above the water level of the tank, and defines at least one opening 8, optionally two or three openings, which allows liquid discharged from pipe 2 to pass through the wall 7 to tank outlet 4. It will be appreciated that wall 7 may be of any design which at least partially inhibits effluent from pipe 2 passing directly to tank outlet 4. Accordingly, wall 7 may extend part way across the tank 1, part way along the height or tank 1 or the like.

Pipe 2 provides a flooded, anaerobic environment for sewage passing through the pipe. As used herein, the term "flooded" refers to an environment whereby the pipe is filled with sewage and does not contain any, or at most a minimal amount of, air. As used herein, the term "anaerobic" refers to an environment without oxygen, or with only a minimal amount of oxygen, such that it can support the growth of anaerobic microorganisms such as anaerobic bacteria. Without being bound by theory, it is thought that a pipe as described herein provides a consistent and severe anaerobic microbial environment, as there is no or minimal air space and oxygen, and no hydraulic short-circuiting, which in turn provides improved solids digestion and removal compared to the standard anaerobic environment of a septic tank with an air space that allows entry of additional oxygen beyond what is brought in with the sewage.

Sewage includes both solid waste and waste water. The solid waste is also referred to herein as "sewage solids" and includes toilet paper, fecal matter, etc. In operation, the sewage introduced into pipe 2 generally separates into a solid component comprising a biologically active sludge produced in situ and a liquid component. As used herein, the term "sludge" refers to the sludge granules that are formed within the pipe. The sludge may be flocculent and/or granular in nature. The sludge is such that it substantially remains in the pipe, with waste water passing through and around it. The granules (also referred to herein as particles), that are included in the sludge may comprise hydrolytic bacteria, acidogen/acetogens and methanogens which operate at various stages of the anaerobic digestion process. The sludge granules range in size but can be 1-3 mm in diameter and have approximately neutral buoyancy in the water.

Without being bound by theory, it is thought that the separation of sludge and liquid in pipe 2 allows difficult-to-digest solids to be digested (for example, broken down by microorganisms) because they and the sludge produced in situ are resident in the pipe for a greater period of time while the liquid fraction and microbial waste products (which can include, but are not limited to, sugars, gases, water etc.) are moved along and do not become stagnant. This 'separation' differs from that in a standard box-like septic tank where solids can settle to and accumulate in hydraulically stagnant zones where continued microbial digestion is limited due to accumulation of microbial waste products. In the present disclosure, the biologically active sludge is a separate physical phase from the liquid portion but still remains generally in the sewage flow channel of the pipe 2. With the liquid portion moving around and through the biologically active sludge granules, anaerobic digestion can be maximized and more sewage solids digested. Accordingly, the continual flow of waste through the pipe allows improved digestion of the solid waste to be treated and avoids untreated waste settling in a portion of the tank with no or minimal flow as in standard box-like septic tanks.

Accordingly, in one embodiment, the volume of the pipe may be selected to provide a longer residence time for sewage solids entering the pipe and sludge formed in the pipe than waste water entering the pipe, whereby a first portion of waste water which enters the pipe accompanied by a first portion of sewage solids exits the pipe prior to the first portion of sewage solids. In one embodiment, a longer pipe is used, rather than a short stubby pipe. In the pipe, the sewage solids evolve from inactive raw sewage solids (toilet paper, fecal matter, etc.) to the digested anaerobic sludge described above. Accordingly, in one embodiment, the sewage solids pass through the pipe 2, forming sludge that remains in the pipe 2, and the treated liquid effluent with dissolved digestion products and fewer suspended solids exit the tank. This process differs from a box-like tank in which solids can separate physically but accumulate in hydraulically stagnant, microbially inactive areas of the tank, away from the active flow and active digestion areas.

As used herein, the terms "residence time" or "retention time" reflects the length of time (hours or days) that sewage remains in pipe 2 before exiting into tank 1. As described above, the septic system of the present disclosure results in the separation of sewage within pipe 2 into a sludge and waste water co-existing in the same space. The retention time of the sludge in pipe 2 (the "solids retention time" (SRT)) is longer than the retention time of the waste water in pipe 2 (the "hydraulic retention time" (HRT)). In one embodiment, the SRT may be at least 12 hours, at least 24 hours, at least 36 hours, at least 48 hours or at least 60 hours. In other embodiments, the SRT may be at least a few days and as much as a few years. In another embodiment, the SRT may be as long as the system is operating and solids are not washed and/or pumped out of the pipe. In other embodiments, where the pipe is sized at 0.1Q, the HRT is 2-3 hours, optionally about 2.4 hours at peak design flow volume Q. When flow is less than the design peak flow rate Q (for example, 0.4 to 0.6Q), HRT is higher.

In some embodiments, the pipe may have a volume of at least 5% of the liquid volume of the tank or from 5 to 20% the liquid volume of the septic tank, optionally about 5% or about 10% the liquid volume of the septic tank. In some embodiments, the pipe may be sized to about 0.1Q to 0.4Q or about 0.2Q. As used herein, "Q" is the estimated peak sewage volume per day, and not the average. In addition, as used herein, a septic tank is preferably designed to contain at least 2.0Q volume; i.e., two days sewage volume at peak design flow.

In other embodiments, the pipe may have a length of at least 50% the length of the septic tank, optionally at least 60%, 100%, 200%, 250% or 300% the length of the septic tank. Various exemplary pipe lengths are provided in Tables 2-7.

Further, in some embodiments, the diameter of the pipe 2 may be selected such that a subsequent second portion of waste water travelling through the pipe travels over and through the first portion of solid waste that remains in the pipe and was earlier introduced into the pipe by the first portion of waste water.

In some embodiments, the diameter of the pipe may be selected such that, in operation, a zone of sludge is formed across the diameter of the pipe. Preferably, the diameter of the pipe is not so narrow as to become plugged with undigested solids, or too large as to allow short-circuiting or by-passing of sewage around the accumulated sludge. In another embodiment, the pipe may have a diameter of at least 5%, 10%, 15%, 20%, 30%, 40% or 45% of the depth of the liquid in the septic tank or between 5 and 50% of the depth of the liquid in the septic tank, optionally between 8% and 30% or about 10% or about 25% of the depth of the liquid in the septic tank.

In one embodiment, the pipe may have a pipe volume of about 10% the tank liquid volume and a diameter of about 25% the liquid depth of the tank.

In further embodiments, the diameter of the pipe may be 6-30 inches, optionally 6-15 inches or 10-12 inches (for example, in a residential septic system) or optionally 15-30 inches or 20-25 inches (for example, in a commercial septic system).

Where the pipe is not a tube, for example in the embodiments shown in FIGS. 3 and 4 where the flow conduit is rectangular in shape, the conduit optionally has a cross-sectional height to width ratio between 0.2 and 2.0 or 0.5 and 1.5, optionally about 1.0. In other embodiments, the conduit may have a cross-sectional area of at least 3%, 5%, 10% or 25% the cross-sectional area of the septic tank. In some embodiments, where the cross-section of the conduit is not uniform along its length, the cross-sectional area of the conduit is the average cross-sectional area.

Pipe 2 may have numerous configurations within tank 1. As exemplified in FIG. 1, in one embodiment, a first portion of pipe 2 slopes downward from an upper end of tank 1 to an opposite, lower end of tank 1 and a second portion of pipe 2 returns to the initial end of tank 1. The second portion may or may not rise towards the upper end of tank 1.

As exemplified in FIG. 2, in another embodiment, a first portion of pipe 2 slopes downward from an upper end of tank 1 to an opposite, lower end of tank 1.

As exemplified in FIG. 3, in another embodiment, pipe 2 descends directly down from an upper end of tank 1 to the bottom of tank 1, then follows along each of the walls of tank 1.

As exemplified in FIG. 4, in another embodiment, pipe 2 descends directly down from an upper end of tank 1 to the bottom of tank 1 and then extends to the opposite end of tank 1.

As exemplified in FIG. 5, in another embodiment, pipe 2 descends from an upper end of tank 1 to a bottom end of tank 1 in a circular manner.

Figure 8:
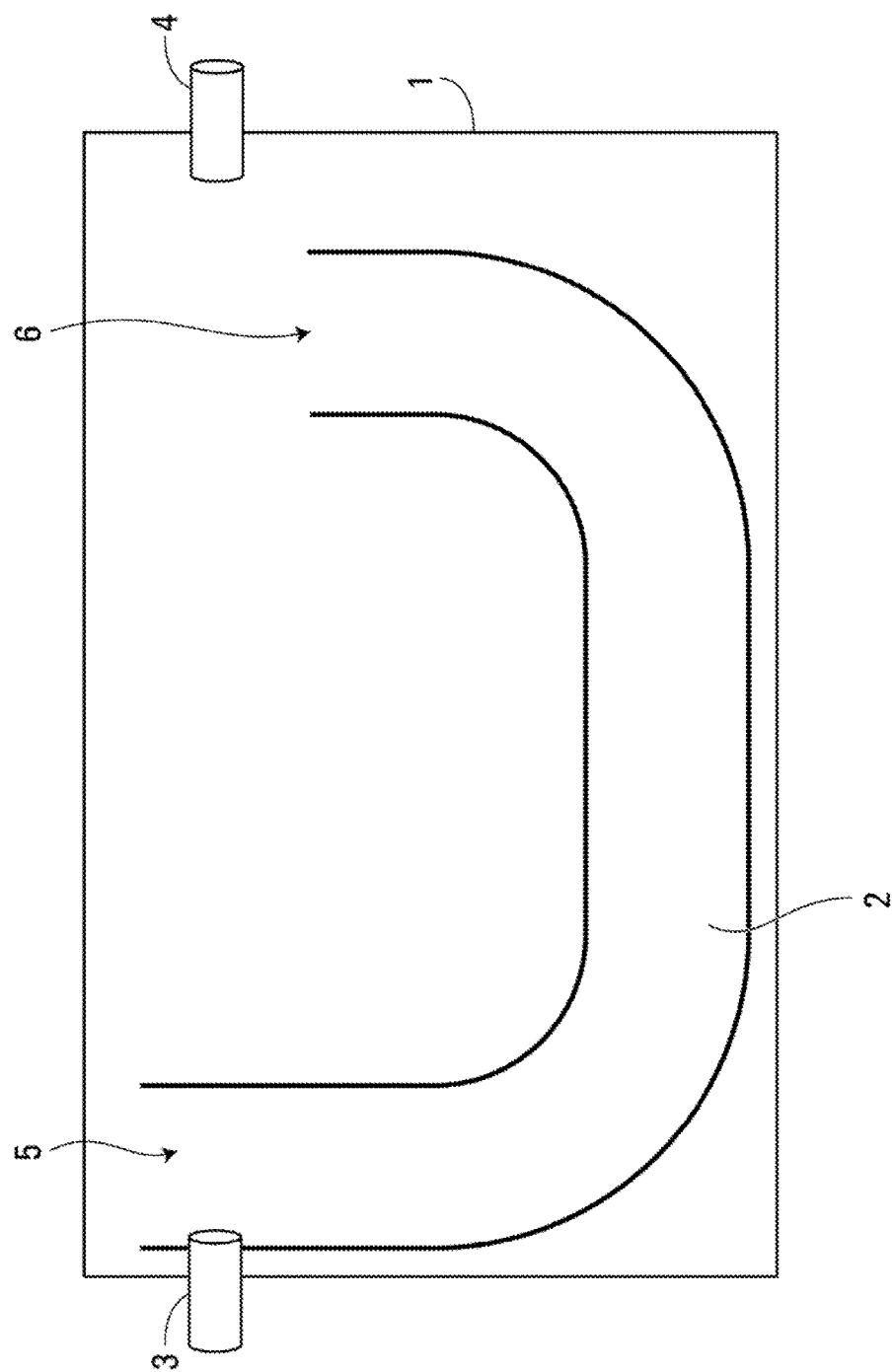
FIG. 8 shows a side view of a further alternate septic system in accordance with at least one embodiment of the disclosure. In this embodiment, the downstream end of pipe 2 extends upwardly to allow gas to escape.
Figure 9:
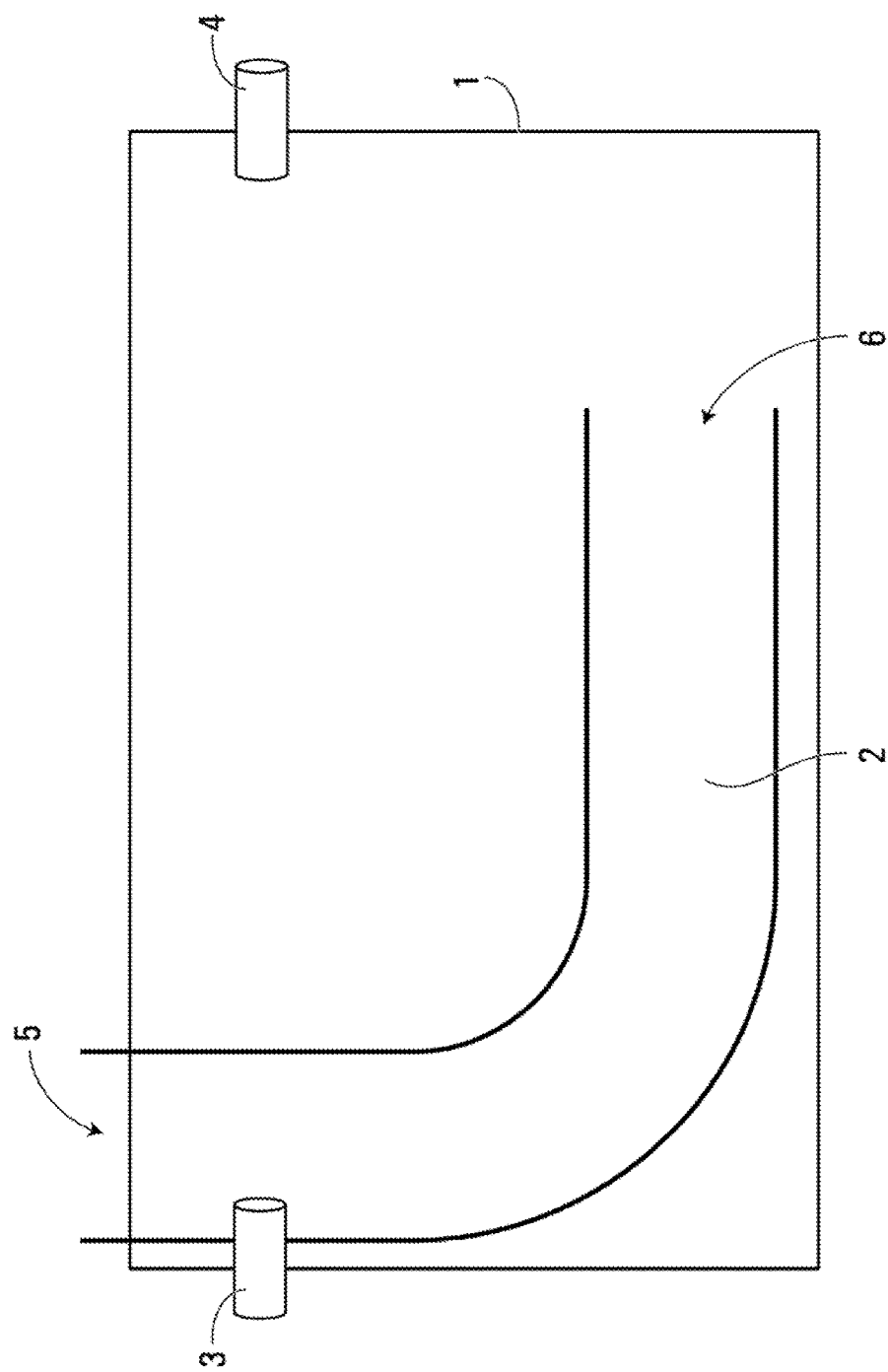
FIG. 9 is a side view of a further alternate septic system in accordance with at least one embodiment of the disclosure wherein pipe inlet 5 is positioned above the roof of the tank.

As exemplified in FIG. 8, in yet another embodiment, the middle portion of pipe 2 remains along the floor of tank 1 and the downstream end of pipe 2 extends upwardly. As gases are produced by digestion in pipe 2, gases may rise up and out pipe inlet 5 and out pipe outlet 6.

Various types of pipes are contemplated. As used herein, the term "pipe" encompasses any longitudinally extending flow conduit. In some embodiments, the pipe may be a flexible pipe. For example, the pipe may be made from a flexible plastic such as high density polyethylene, polypropylene, and the like. In other embodiments, the pipe may be a rigid pipe. For example, the pipe may be made from a rigid material such as ABS or PVC plastics, corrosion resistant metal or concrete. The pipe may be of any cross-section and the cross-section does not have to be uniform along its length. For example, the pipe optionally may have a round, oval, square or rectangular cross-section. In another embodiment, the pipe is a linear chamber (see for example, FIGS. 3 and 4).

As exemplified in FIGS. 1, 2 and 5, the pipe may be separate from tank 1. In such an embodiment, pipe 2 is optionally an add-on component retrofitted to an already existing septic tank.

Because buried septic tanks are tightly packed in the surrounded soil, the loss of heat through the walls of the tank can be significant. A warmer environment aids in sewage digestion, as higher temperatures provide more microbial diversity and increased microbial activity (e.g., Pussayanavin et al., 2015, *J Environ Sci Health Part A*: 50(1):81-89). This results in better digestion of sludge and less frequent pump-outs. Accordingly, in one embodiment, pipe 2 is not in contact with any of the outer walls of tank 1, or only partially in contact therewith, thereby reducing heat loss. In addition, fewer convection currents form, and accordingly less is heat lost by advection, in a smaller diameter pipe as opposed to a larger tank. For example, as exemplified in FIG. 2, the pipe is substantially only in contact with the floor of tank 1 and not the walls of tank 1. As exemplified in FIG. 5, the centre section of the pipe rests on itself and does not contact tank 1.

In some embodiments, as exemplified in FIGS. 3 and 4, all or part of pipe 2 may be built into tank 1. Optionally, at least one of the walls defining pipe 2 may comprise a portion of at least one of the inner walls of tank 1.

Figure 6A:
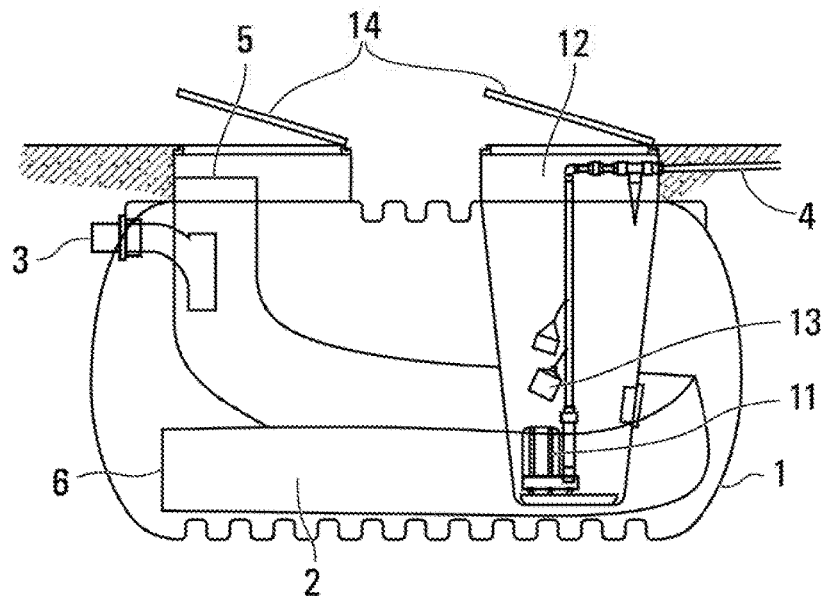
FIG. 6A is a side view and FIG. 6B is the same side view showing liquid levels within tank 1 and water flow within pipe 2.
Figure 6B:
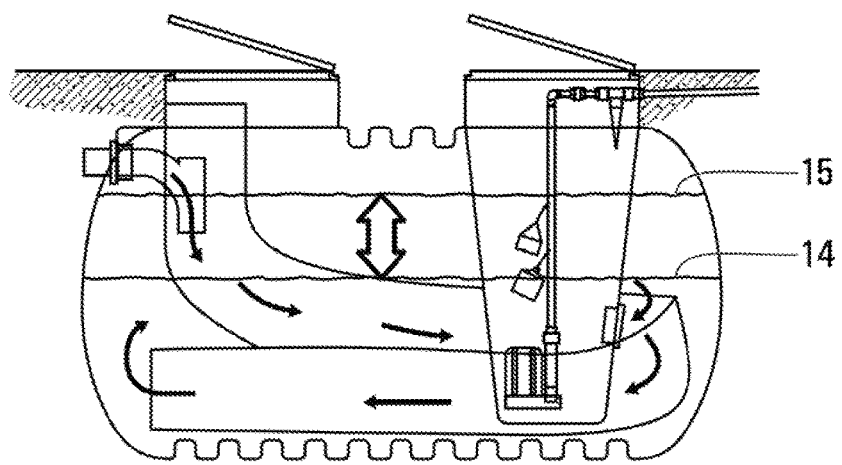

In some embodiments, effluent leaves tank 1 through tank outlet 4 when the liquid level of tank 1 is higher than outlet 4. In other embodiments, effluent is actively pumped out of tank 1. For example, FIG. 6 depicts one embodiment of the disclosure, wherein effluent from tank 1 is pumped out of the tank by pumping unit 11 which may be positioned within tank 1. For example, waste may enter interior pumping tank 12 from which it is ejected by pump 11. In this embodiment, effluent may be pumped out of the tank, even when the tank liquid level (for example, tank liquid level 14 or 15) is below that of tank outlet 4 (see FIG. 6B). Float switches 13 may control the pump on and off times.

One advantage of the septic systems described herein is that tank 1 may be fed with raw sewage directly from a sewage pipe. In other words, no pretreatment of the sewage is necessary before it is provided to tank 1 through tank inlet 3. Accordingly, in one embodiment, tank inlet 3 is connected directly to a sewage pipe. In another embodiment, the septic system has an absence of a sump chamber upstream of the septic tank. As used herein, the term "sump chamber" refers to a below ground chamber used to collect solids from raw sewage prior to entering a septic tank. In other embodiments, raw sewage is gravity-fed to tank 1 such that no pump is necessary (for example, a sump pump) to pump sewage into tank 1.

As is well known in the art, septic tanks can be used in conjunction with other waste water treatment units. The additional waste water treatment units are typically downstream of the septic tank. For example, a soil leach field may be down stream of the septic tank for disposal of the septic effluent. Waste water treatment units include, but are not limited to aerobic systems, filters such as sand or other media, biofilters, UV treatment units, and means for sampling the liquid in the system (for example, sampling wells).

Figure 7:
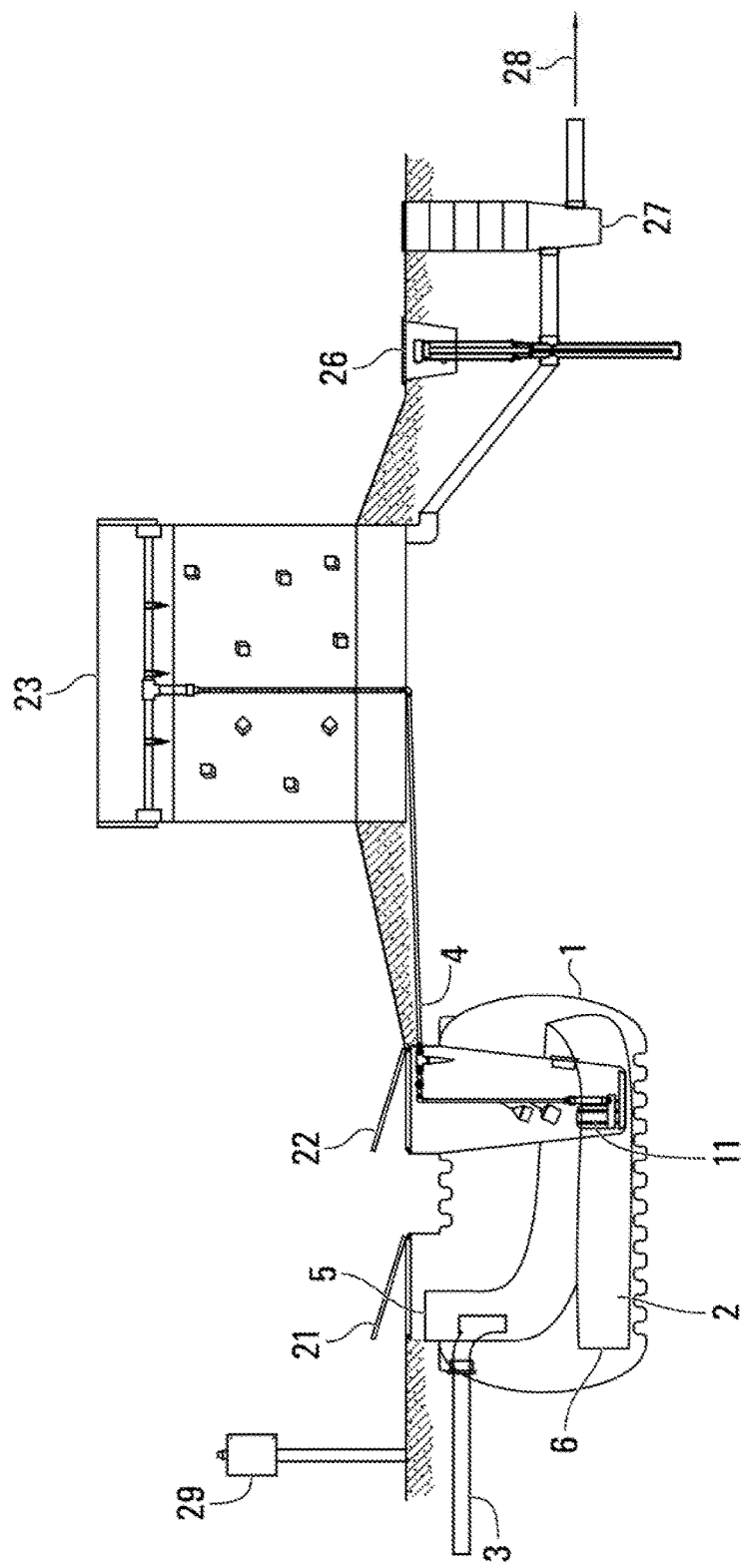
FIG. 7 shows a side view of a further alternate septic system in accordance with at least one embodiment of the disclosure. Downstream of septic tank 1 is an above ground treatment tank 23 and a UV reactor 26.

FIG. 7 exemplifies a septic system in accordance with another embodiment of the disclosure. As exemplified, tank 1 with pipe 2 positioned within, is located upstream of above-ground treatment unit 23, UV reactor 26 and sampling wells 27. Treatment unit 23 is an open cell polyurethane foam filtration medium. It can be buried, at-grade, or above-ground. Other filtration devices such as sand filters, soil filters, peat filters, etc. can be used as well. In one embodiment, following the anaerobic treatment of raw sewage in digester tank 1 of the present disclosure, the effluent is aerobically filtered in treatment unit 23 to remove at least 98% of *E. coli* microbes and other pathogens, nitrify ammonium to nitrate, and biologically filter out remaining suspended solids and dissolved organic matter. The UV reactor 26 generates strong ultraviolet light to kill remaining pathogens in the clear effluent of the treatment unit 23. In operation, sewage is provided to tank inlet 3 and into pipe 2. Pump 11 pumps effluent out of tank 1 through tank outlet 4. The effluent then slowly flows down through aboveground treatment unit 23 and UV reactor 26 before being sampled in sampling wells 27 before being discharged, for example to a leach field, through system outlet 28. The system also optionally includes a control panel 29 and tank covers 21.

Various methods of measuring the performance of a septic tank are known. For example, the removal of carbonaceous biochemical oxygen demand (cBOD) and total suspended solids (TSS) from raw sewage by a septic system can be measured. In one embodiment of the disclosure, at least 20, 30, 40, 50, 60, 70, 80 or 90% of the cBOD and at least 20, 30, 40, 50, 60, 70, 80 or 90% of TSS is removed by anaerobic digestion in tank 1 encompassed by the present disclosure. In another embodiment of the disclosure, at least 50, 60, 70, 80, 90, 95 or 98% of the cBOD and TSS are removed by a septic system encompassed by anaerobic digestion in tank 1 of the present disclosure followed by treatment unit 23. These values can be determined by comparing the TSS and cBOD of the sewage entering tank 1 with the TSS and cBOD of the effluent exiting tank 1 and treatment unit 23. Methods of measuring cBOD and TSS are well known in the art. Another method of measuring performance of a septic tank is the accumulation of sludge over time. An advantage of the present disclosure is the ability to digest more sludge so that pump-outs are less frequent, and the cost of operation is thereby minimized.

In another broad aspect of the disclosure, a method for treating sewage using the septic systems described herein is provided. Also provided is a process for treating sewage using the septic systems described herein.

Accordingly, in one embodiment, a process for treating sewage is provided comprising:
 (a) providing sewage to be treated through an inlet in a septic tank to an inlet end of a pipe positioned within the septic tank, wherein the pipe provides a flooded, anaerobic environment for the sewage passing thereto, and
 (b) flowing the sewage through the pipe to an outlet of the pipe, such that the sewage digests into a solid portion comprising sludge and a liquid portion, whereby the liquid portion travelling through the pipe travels over and through the sludge that remain in the pipe, and
 (c) flowing or pumping treated water out of an outlet of the septic tank, the outlet of the tank being spaced from the outlet of the pipe.

In some embodiments, the process may include providing sewage to be treated directly to the septic tank, without first flowing the sewage through a sump chamber upstream of the septic tank.

In some embodiments, the solid waste may have a longer residence time in the pipe than the water waste.

In some embodiments, the process includes removing at least 20, 30, 40, 50, 60, 70, 80 or 90%, optionally about 50% of the cBOD from the sewage. In some embodiments the process may include removing at least 50, 60, 70, 80, 90, 95 or 98%, optionally about 70% of the TSS from the sewage.

EXAMPLES

Testing shows that an "InnerTube digester" comprising septic tank with a pipe positioned within can receive raw sewage directly without going through an initial sump chamber or larger tank without clogging. Improved treatment results over conventional septic tanks are seen, especially with respect to total suspended solids (TSS) removal and solids accumulation, with a reasonable improvement in carbonaceous biochemical oxygen demand (cBOD) removal as well.

(1) Comparative Performance at BNQ Test Facility

Side by side testing at the Bureau de Normalisation de Quebec (BNQ) test facility in Quebec Canada showed that the InnerTube digester performed substantially better in solids digestion than a standard septic tank of the same size and same sewage flow of 1500 L/day.

A 750 US gallon Roth brand septic tank and an InnerTube digester were installed side by side in parallel with sewage flow of 1500 L/day delivered to each tank. The Digester tank contained 15' of 12" diameter InnerTube pipe receiving sewage. The tank had no effluent filter. Note that pump vaults at the outlet end did not allow accumulated solids measurements at the outlet end.

Within 5 months of operation (including a record harsh winter), the septic tank had accumulated 33" of sludge in the first compartment compared to 11" in the first compartment of the InnerTube digester tank (taken where the InnerTube pipe exits into the tank). After 8 months the septic tank had accumulated solids from floor to airspace, solid enough to support a metal rod standing up in it, and required pumping out. The InnerTube tank under the same conditions had no scum in the inlet or outlet area and only a minor amount of sludge, not sufficient to warrant a pump-out.

At Day=540 or 10 months after its first pump-out, the septic tank again had 38" of sludge in 39" of liquid height, enough to require a second pump-out.

In the first 8-month period, although only 3 samples were taken, the InnerTube digester effluent was 7.4% better in cBOD, 30.1% better in TSS, and 9.2% better in fecal coliforms than the septic tank effluent. This shows that the InnerTube digester produces a substantially improved effluent with respect to suspended solids removal. The actual cBOD removal is not expected to be much better, since the digested solids will produce dissolved cBOD (sugar, fatty acids, etc.), adding to the cBOD value, though making it an easier, more 'labile' effluent to treat than cBOD bound up in larger molecules.

(2) Performance at MASSTC Test Facility

At the Massachusetts Alternative Septic System Test Center (MASSTC) at the Otis Air Force Base, Cape Cod MA a 1500 US gallon InnerTube digester was tested over a four-year period. The tank contained 15 feet of 12" diameter InnerTube pipe into which raw sewage was emplaced. The tank had no effluent filter.

After years of continual use, the sludge accumulation at the inlet end could not be measured due to interference with the InnerTube pipe but likely the intervening space at the inlet was largely filled with scum and sludge. However, over this test period, no scum at all appeared in the outlet end of the single-compartment tank, and after the extended period of continual use, there was only 6" of sludge in the outlet end. The InnerTube tank remained operational and did not need pumping out even after receiving 1.53 million litres of sewage.

The average cBOD and TSS values of the InnerTube tank effluent were 101 mg/L and 51 mg/L, representing removal rates of 47% and 75% respectively, from the BOD and TSS sewage values. This is very good performance for primary treatment, especially for TSS removal, similar to the BNQ case.

The foregoing tests show that using a small diameter treatment pipe to receive sewage directly, without an inlet solids chamber or without a larger diameter tubular tank, provides the same or better treatment results as a septic system with an inlet chamber, but with substantial cost reductions. Without being bound by theory, it is believed that short-circuiting is minimized by the long and narrow configuration of the InnerTube pipe and a different type of sludge is likely formed. Liquid passes over and through the sludge to remove waste products and prevent stagnation.

(3) Various Pipe Diameters and Pipe Lengths for Given Tank Dimensions

TABLE 1

List of interior tank dimensions and tank capacities for various septic tank models

| Tank Model | Interior Tank Dimensions (inches) | | | Tank Working Capacity (L) |
|---|---|---|---|---|
| | Length | Width | Depth (to outlet invert) | |
| ST-500 (Roth) | 62 | 62 | 42 | 1,794 |
| ST-750 (Roth) | 103 | 62 | 42 | 3,399 |
| MAC-2700 (MacGregor Concrete) | 81 | 41 | 49 | 2,666 |
| 600 GAL Holding (Brooklin Precast) | 90 | 42 | 48 | 2,972 |
| 1000 GAL Low height holding (Brooklin) | 107 | 76 | 37 | 4,928 |
| 2000 GAL low height holding (Newmarket) | 168.25 | 89.5 | 33 | 8,140 |
| 2000 GAL Holding tank (Reid's Precast) | 109.25 | 62.25 | 64 | 7,129 |
| 9400 L (Boyd Brothers) | 135 | 88.5 | 48 | 9,394 |
| S20SS (Wilkinson Heavy Precast) | 207.5 | 89.25 | 65 | 19,642 |
| 20000 GAL Holding (Brooklin) | 344 | 128 | 116 | 83,664 |
| S105SS (Wilkinson Heavy Precast) | 336.25 | 125.5 | 152.5 | 105,412 |

Tables 2-7 set out below are based off:
1. a given pipe volume (percent of total tank volume contained within the pipe), and
2. a given pipe diameter to tank water level depth ratio (determining what diameter of pipe is used).

TABLE 2

Pipe diameters and lengths given a pipe volume of 5% and a diameter: depth ratio of 10%

| Pipe Dia. (in) | Pipe Length (ft) |
|---|---|
| 4.2 | 32.9 |
| 4.2 | 62.4 |
| 4.9 | 35.9 |
| 4.8 | 41.8 |
| 3.7 | 116.5 |
| 3.3 | 242.0 |
| 6.4 | 56.3 |
| 4.8 | 132.0 |
| 6.5 | 150.5 |
| 11.6 | 201.3 |
| 15.3 | 146.7 |

TABLE 3

Pipe diameters and lengths given a pipe volume of 5% and a diameter: depth ratio of 25%

| Pipe Dia. (in) | Pipe Length (ft) |
|---|---|
| 10.5 | 5.3 |
| 10.5 | 10.0 |
| 12.3 | 5.8 |
| 12.0 | 6.7 |
| 9.3 | 18.6 |
| 8.3 | 38.7 |
| 16.0 | 9.0 |
| 12.0 | 21.1 |
| 16.3 | 24.1 |
| 29.0 | 32.2 |
| 38.1 | 23.5 |

TABLE 4

Pipe diameters and lengths given a pipe volume of 10% and a diameter: depth ratio of 10%

| Pipe Dia. (in) | Pipe Length (ft) |
|---|---|
| 4.2 | 65.8 |
| 4.2 | 124.8 |
| 4.9 | 71.9 |
| 4.8 | 83.5 |
| 3.7 | 233.1 |
| 3.3 | 484.0 |
| 6.4 | 112.7 |
| 4.8 | 264.0 |
| 6.5 | 301.0 |
| 11.6 | 402.6 |
| 15.3 | 293.5 |

TABLE 5

Pipe diameters and lengths given a pipe volume of 10% and a diameter: depth ratio of 25%

| Pipe Dia. (in) | Pipe Length (ft) |
|---|---|
| 10.5 | 10.5 |
| 10.5 | 20.0 |
| 12.3 | 11.5 |
| 12.0 | 13.4 |
| 9.3 | 37.3 |
| 8.3 | 77.4 |
| 16.0 | 18.0 |
| 12.0 | 42.2 |
| 16.3 | 48.2 |
| 29.0 | 64.4 |
| 38.1 | 47.0 |

TABLE 6

Pipe diameters and lengths given a pipe volume of 15% and a diameter: depth ratio of 10%

| Pipe Dia. (in) | Pipe Length (ft) |
|---|---|
| 4.2 | 98.8 |
| 4.2 | 187.1 |
| 4.9 | 107.8 |
| 4.8 | 125.3 |
| 3.7 | 349.6 |
| 3.3 | 725.9 |

TABLE 6-continued

Pipe diameters and lengths given a pipe
volume of 15% and a diameter: depth ratio of 10%

| Pipe Dia. (in) | Pipe Length (ft) |
| --- | --- |
| 6.4 | 169.0 |
| 4.8 | 396.0 |
| 6.5 | 451.5 |
| 11.6 | 603.9 |
| 15.3 | 440.2 |

TABLE 7

Pipe diameters and lengths given a
pipe volume of 15% and a
diameter: depth ratio of 25%

| Pipe Dia. (in) | Pipe Length (ft) |
| --- | --- |
| 10.5 | 15.8 |
| 10.5 | 29.9 |
| 12.3 | 17.3 |
| 12.0 | 20.0 |
| 9.3 | 55.9 |
| 8.3 | 116.1 |
| 16.0 | 27.0 |
| 12.0 | 63.4 |
| 16.3 | 72.2 |
| 29.0 | 96.6 |
| 38.1 | 70.4 |

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A septic system comprising:
(a) a septic tank having an inlet, an outlet, a liquid volume, a length and a liquid depth; and,
(b) a pipe positioned within the septic tank, the pipe having an inlet at the upstream end of the pipe, an outlet at the downstream end of the pipe, and a contiguous volume from the inlet to the outlet, the inlet end of the pipe connected to the inlet of the septic tank whereby the pipe receives sewage and provides a flooded, anaerobic environment for sewage passing therethrough, the outlet of the pipe positioned inside the septic tank, and wherein the pipe has a diameter of at least 10% the liquid depth of the tank, and at least one of; a volume of at least 5% that of the liquid volume of the tank, and a length of at least 50% the length of the tank.

2. The septic system of claim 1, wherein the pipe has a diameter of at least 10% the liquid depth of the tank, a volume of at least 5% that of the liquid volume of the tank, and a length of at least 50% the length of the tank.

3. The septic system of claim 1, wherein all or part of the pipe is built into a wall of the septic tank.

4. The septic system of claim 1, wherein the downstream end of the pipe extends upwardly.

5. The septic system of claim 1, wherein the outlet of the pipe is spaced from the outlet of the septic tank.

6. The septic system of claim 1, wherein the pipe is flexible.

7. The septic system of claim 1, wherein the sewage has a residence time of 3-15 hours in the pipe.

8. The septic system of claim 1, wherein the pipe has a volume of 5-20% the liquid volume of the septic tank.

9. The septic system of claim 1, wherein the pipe has a diameter of 6-15 inches.

10. The septic system of claim 1, wherein the pipe has a diameter of 15-30 inches.

11. The septic system of claim 1, wherein the outlet of the pipe faces towards the inlet of the septic tank.

12. The septic system of claim 1, wherein the pipe has a first portion that extends away from the inlet to the septic tank and a second downstream portion that extends back towards the inlet of the septic tank.

13. The septic system of claim 1, wherein the outlet of the septic tank is at an upper end of the septic tank and the outlet of the pipe is at a lower end of the septic tank.

14. The septic system of claim 1, wherein the outlet of the pipe is located towards the outlet of the septic tank.

15. A septic system comprising:
(a) a septic tank having an inlet, an outlet, a liquid volume, a length and a liquid depth; and,
(b) a pipe positioned within the septic tank, the pipe having an inlet at the upstream end of the pipe, and an outlet at the downstream end of the pipe, the inlet end of the pipe connected to the inlet of the septic tank whereby the pipe receives sewage and provides a flooded, anaerobic environment for sewage passing therethrough, the outlet of the pipe positioned inside the septic tank, and wherein the pipe has a diameter of at least 10% the liquid depth of the tank, and at least one of; a volume of at least 5% that of the liquid volume of the tank, and a length of at least 50% the length of the tank,
wherein the inlet to the septic tank is connected directly to a sewage pipe whereby the septic system has an absence of a sump chamber upstream of the septic tank.

16. The septic system of claim 15, wherein the pipe has a contiguous volume from the inlet to the outlet.

17. A septic system comprising:
(a) a septic tank having an inlet, an outlet, a liquid volume, a length and a liquid depth; and,
(b) a flow conduit positioned within the septic tank, the conduit having an inlet at the upstream end of the conduit, an outlet at the downstream end of the conduit and a contiguous volume from the inlet to the outlet, the inlet end of the conduit connected to the inlet of the septic tank whereby the conduit receives sewage and provides a flooded, anaerobic environment for sewage passing therethrough, the outlet of the conduit is positioned inside the septic tank, and wherein the conduit has a cross-sectional area of at least 3% of a cross-sectional area of the tank, and at least one of; a cross-sectional height to width ratio of between 0.2 and 2.0, a volume of at least 5% that of the liquid volume of the tank, and a length of at least 50% the length of the tank.

18. The septic system of claim 17, wherein the conduit has a cross-sectional area of at least 3% of a cross-sectional area of the tank, a cross-sectional height to width ratio of between 0.2 and 2.0, a volume of at least 5% that of the liquid volume of the tank, and a length of at least 50% the length of the tank.

19. The septic system of claim 17, wherein the outlet of the conduit is spaced from the outlet of the septic tank.

20. The septic system of claim 17, wherein the outlet of the conduit faces towards the inlet of the septic tank.

21. The septic system of claim 17, wherein the conduit has a first portion that extends away from the inlet to the septic tank and a second downstream portion that extends back towards the inlet of the septic tank.

22. The septic system of claim 17, wherein the outlet of the septic tank is at an upper
end of the septic tank and the outlet of the conduit is at a lower end of the septic tank.

23. The septic system of claim 17, wherein the outlet of the conduit is located towards the outlet of the septic tank.

* * * * *